(12) United States Patent
Fauqué

(10) Patent No.: US 6,220,080 B1
(45) Date of Patent: Apr. 24, 2001

(54) EXTENDED RANGE AND ULTRA PRECISION NON CONTACT DIMENSIONAL GAUGE FOR ULTRA THIN WAFERS AND WORK PIECES

(75) Inventor: Jacques A. Fauqué, Los Gatos, CA (US)

(73) Assignee: Sigma Tech, Inc., Tempe, AZ (US)

( * ) Notice: Subject to any disclaimer, the term of this patent is extended or adjusted under 35 U.S.C. 154(b) by 0 days.

(21) Appl. No.: 09/570,229

(22) Filed: May 12, 2000

(51) Int. Cl.⁷ .............. G01B 13/06; G01L 9/10
(52) U.S. Cl. .............. 73/37.5; 73/1 J; 118/172
(58) Field of Search ............ 73/37.5, 1 J; 118/712

(56) References Cited

U.S. PATENT DOCUMENTS

| | | | | |
|---|---|---|---|---|
| 4,270,382 | * | 6/1981 | Kamman | 73/37.5 |
| 4,325,248 | * | 4/1982 | Kolosov | 73/37.5 |
| 4,358,960 | * | 11/1982 | Porter | 73/705 |
| 4,364,270 | * | 12/1982 | Heinzl et al. | 73/298 |
| 4,550,592 | * | 11/1985 | Dechape | 73/37.5 |
| 4,594,881 | * | 6/1986 | Imamura | 73/37.5 |
| 4,604,892 | * | 8/1986 | Carreras | 73/37.5 |
| 4,607,525 | * | 8/1986 | Turner et al. | 73/37.5 |
| 4,607,960 | * | 8/1986 | Wulff | 374/7 |
| 4,658,633 | * | 4/1987 | Freer | 73/37.5 |
| 4,724,701 | * | 2/1988 | Mon | 73/37.5 |
| 4,953,388 | * | 9/1990 | Barada | 73/37.5 |
| 4,986,111 | * | 1/1991 | Sidey | 73/37.5 |
| 5,087,927 | * | 2/1992 | Thomas et al. | 346/108 |
| 5,121,688 | * | 6/1992 | Williams et al. | 101/142 |
| 5,140,846 | * | 8/1992 | DeCool et al. | 73/37.5 |
| 5,163,312 | * | 11/1992 | Ayers | 73/37.5 |
| 5,298,073 | * | 3/1994 | Wilson | 118/712 |
| 5,540,082 | * | 7/1996 | Okuyama | 73/37.5 |
| 5,789,661 | * | 8/1998 | Faugué et al. | 73/37.5 |

* cited by examiner

*Primary Examiner*—Hezron Williams
*Assistant Examiner*—David J. Wiggins
(74) *Attorney, Agent, or Firm*—Boris G. Tankhilevich (57) ABSTRACT

A method and a system for measurement the geometrical parameters of ultra thin wafers with the thickness less than 200 microns. The measurement system comprises two measurement channels and a computer. Each measurement channel comprises a motor-positionable probe further comprising a back pressure probe and a capacitive probe. The capacitive probe is substantially cocentric with the back pressure probe. The air back pressure sensor is used to calibrate the capacitive sensor for a given dielectric permittivity of the conductive target, and the capacitive sensor is used to measure thickness, flatness, bow, and warpage of the ultra-thin electrically conductive target.

18 Claims, 3 Drawing Sheets

EXTENDED RANGE AND ULTRA PRECISION NON CONTACT DIMENSIONAL GAUGE FOR ULTRA THIN WAFERS AND WORK PIECES

FIELD OF THE INVENTION

The current invention is in the field for gauging the thickness of conductive targets, and more specifically, in the field for ultra precision non contact dimensional gauging the geometrical properties of ultra thin conductive wafers.

DESCRIPTION OF THE BACKGROUND ART

In the available art, the non-contact sensing and pneumatic gauging is based on measuring the backpressure of compressed air flow to a nozzle in very close proximity to a workpiece surface. In a prior art conventional pneumatic gauging circuit, the air gap distance between the nozzle outlet and the workpiece surface is estimated by using the back pressure in a chamber through which compressed air is flowing via a restricted orifice. Such back pressure is function of the distance that separates the tip of the nozzle connected to the chamber and the adjacent surface of the workpiece. The supply air pressure to the back pressure circuits is precisely regulated.

The back pressure measurement circuits are very sensitive to regulator pressure variations because the output pressure variations appear as common mode noise to the detector. To reduce this sensitivity, a back pressure measurement information can be taken in a differential mode. In this mode, two air flow branches are used from a common inlet to separate outlets. The flow of air to a measurement pressure chamber is regulated in each branch by a fixed control orifice. One of the pressure chambers is connected to a pneumatic gauge nozzle affected by the measurement air gap. The other pressure chamber is vented to atmosphere through a reference orifice for datum control. An expansible bellows is connected in prior art systems to each pressure chamber. A flexible diaphragm can also be used to separate the two pressure chambers. The differential motion is detected and measured as a function of the difference of pressure in the pressure chambers. The extent of such differential motion is related to the air gap between the air gauge nozzle and the adjacent surface of the workpiece. Any fluctuations in air pressure due to poor regulation, or due to the temperature fluctuations, will cancel if back pressure is the same on both sides.

The measured air back pressure can be displayed relative to a calibrated scale graduated in thousandths of an inch or millimeters. In some prior art conventional pneumatic gauging systems, the measurement display instrument is electrically driven, even though it may be in the apparently traditional form of a vertical scale instrument. A prior art displacement transducer takes form of a variable transformer having a movable core for varying the mutual inductance between the primary and secondary windings of the transformer as function of the displacement of the core. The input member of the displacement transducer displaces the movable core. The primary winding of the transducer transformer is connected across a power supply. The output signal as a function of the linear displacement of the transformer core, can be read as an analog output of a vertical scale instrument imitating a U-tube manometer display, or as a digital output of a digital manometer display.

The U.S. Pat. No. 5,789,661, entitled "Extended range and ultra precision non contact dimensional gauge", and issued to Fauqué in 1998, is incorporated in its entirety in the present patent application. The '661 patent discloses a non-contact pneumatic-electric wafer measurement system with accuracies better than 0.5 micron. A measurement head is held aloft over the wafer and base, and the tip of an air nozzle in the measurement head is directed at the wafer and automatically extended to near contact. The nozzle is servo-positioned by an air sensor and motor combination with an overall precision of positioning of about 3–4 microns. A linear displacement gauge is attached to the air nozzle and is used to determine the nozzle position to within 0.5 micron. The motor positioning error is removed by combining the linear displacement gauge reading with an estimate of the air gap derived from a reading of the air nozzle backpressure that has an accuracy of about 0.1 micron. Thus, the thickness of the wafer is determined with an accuracy of about 0.5 micron.

However, the system of '661 patent cannot be used for measurements of geometrical parameters (for example, the warpage and bow) of ultra-thin wafers with the thickness less than 200 microns. This is due to the fact that the ultra thin wafer with the thickness less than 200 microns vibrates under the air pressure that is used in the back pressure sensor of '661 patent, thus making it impossible to measure the curvature of an ultra-thin wafer.

What is needed is to extend the usage of the measurement system of '661 patent in order to measure the geometrical parameters of an ultra-thin wafer with the thickness less than 200 microns.

SUMMARY OF THE INVENTION

To address the shortcomings of the available art, the present invention provides a method and a system for measurement the geometrical parameters of ultra-thin wafers with the thickness less than 200 microns.

One aspect of the present invention is directed to a measurement system. In the preferred embodiment, the measurement system comprises two measurement channels and a computer. In one embodiment, each measurement channel comprises a motor-positionable probe further comprising a back pressure probe and a capacitive probe. The capacitive probe is substantially cocentric with the back pressure probe. An analog proximity dual sensor is connected to a tip of the motor-positionable probe. The analog proximity sensor outputs a signal that varies in magnitude according to the proximity of the tip to the target. A servo motor is mechanically connected to the motor-positionable probe and provides for an automatic non-contact coarse positioning of the tip within a bandgap distance according to the variable magnitude analog output of the analog proximity sensor. A position gauge is configured to measure the mechanical position of the tip of the motor-positionable probe.

In one embodiment, the target comprises a electrically conductive target. In this embodiment, the capacitive probe further comprises a source of electrical field that generates an electrical field that depends on the distance between the capacitive probe and the electrically conductive target, and on the dielectric permittivity of the conductive target.

The computer is configured to process a set of measurements from each measurement channel, wherein a coarsely servo-positioned position of each motor-positionable probe is precisely determined by the corresponding position gauge, and wherein each precise probe-to-target distance is obtained by the computer from the variable magnitude analog output of the corresponding analog proximity sensor.

In the preferred embodiment, each back pressure probe further comprises an air nozzle that develops increased back pressure within as the tip nears the target. In the preferred embodiment, the target is a conductive target, and each capacitive probe further comprises a source of electrical field that generates an electrical field that depends on the distance between the capacitive probe and the conductive target, and on the dielectric permittivity of the conductive target. In this embodiment, each analog proximity sensor further comprises an air pressure sensor with a backpressure analog electric output that increases as the tip nears the target, and a capacitive sensor with a capacitive analog electric output that depends on the distance between the capacitive probe and the target. Each capacitive analog electric output is calibrated using the backpressure analog electric output.

Another aspect of the present invention is directed to a method for a noncontact measurement of thickness, flatness, bow, and warpage of an ultra-thin conductive target using an above described measurement system. In one embodiment, the method comprises the following basic steps: (a) using the air back pressure sensor to calibrate the capacitive sensor for a given dielectric permittivity of the conductive target; (b) shutting off an air flow to suppress induced vibrations of the ultra-thin conductive target; and (c) using the capacitive sensor to measure thickness, flatness, bow, and warpage of the ultra-thin conductive target.

Yet, one more aspect of the present invention is directed to a method for a non-contact measurement of a dielectric permittivity of a conductive target by using the above described measurement system. In one embodiment, the method comprises the following steps: (a) using the air back pressure sensor to calibrate the capacitive sensor for an arbitrary dielectric permittivity of the conductive target; (b) using both the calibrated capacitive sensor and the air back pressure sensor to measure the analog proximity dual sensor voltage signal and the distance of the tip to the target, and to build the measurement equation; and (c) deducting the dielectric permittivity of the conductive target from the measurement equation.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

An ultra thin wafer (with thickness less than 200 microns) is not rigid. When placed on the stage and held at 3 points near the edge, due to gravity, a wafer tends to bow in the center. In addition, the stress induced in a wafer through various manufacturing processes tends to give the wafer a specific shape with warpage. Bow and warpage can reach relatively large dimensions (over 1000 microns).

The prior art methods of gauging the geometrical parameters of a wafer, (like thickness, bow, and warpage) have their limitations. Indeed, when using the prior art capacitive sensors for gauging purposes, the capacitive probes have to be maintained fixed and allow only maximum bow and warpage in the range of 500 microns. For such prior art optical methods as laser beam, the wafer surface finish and the wafer's type of material generally created measurement problems. For the prior art air gauging method, air flow tends to induce vibrations on very thin work pieces (or wafers) unless the work pieces (or wafers) are measured on a vacuum chuck. But, the vacuum chuck measurements of the geometrical parameters of work pieces (or wafers) do not allow the simultaneous measurements of bow and warpage of ultra thin work pieces (or wafers) because the vacuum chuck flattens the surface of an ultra thin piece.

The present invention discloses the dual sensing methodology that allows one measure the thickness, bow, and warpage of ultra thin wafers (and/or work pieces) at the same time.

Indeed, the limitation of capacitive sensing is related to the fact that it is an electrical method, which means that the voltage output of the capacitive sensor is function of both the distance from the probe to the surface, and the dielectric permittivity of the wafer. Therefore, the prior art electrical sensors that used the pure capacitive sensors had to calibrate the capacitive sensor using a master wafer with the known dielectric permittivity Ko in order to build the table for the voltage output V as a function of the distance d from the probe to the surface: $V=1/K_0\ f(d)$. The prior art pure capacitive sensor had to maintain its electrodes fixed (in order to satisfy the calibration function built for the master wafer with the known dielectric permittivity $K_0$) which limited the range for measurable bows and warpages up to 500 microns.

The present invention discloses the dual sensing technology that combines the usage of a capacitive sensor with the usage of a backpressure air sensor. The combination of both sensors provides for an automatic universal calibration process independent of the dielectric permittivity K of the wafer. Indeed, the air sensor can be used to accurately measure the distance d from the probe to the wafer and therefore allows one to build the table $V=f(d)$ for the voltage output V of the capacitive sensor. There is no need to know K as long as all wafers to be measured are of the same type, and therefore have the same dielectric permittivity K. So, the air sensor is used to calibrate the capacitive sensor, and then, after the air is turned off to suppress the induced vibrations of the ultra thin wafer, the capacitive sensor is used to control the motor for positioning of the tip of the probe and measure the gap d between the tip of the probe to the surface of the wafer. This method allows to measure the thickness, bow and warpage by mapping the surface of an ultra thin wafer of any type.

The measurement system of the present invention can be also used to measure the dielectric permittivity K of an ultra thin conductive target. In this embodiment, the measurement system of the present invention at first measures the geometrical parameters of a master wafer with a known dielectric permittivity $K_0$. Thus, the air sensor/capacitive sensor table $V_0=1/K_0\ f(d)$ can be built for the master wafer. Then, the dielectric permittivity K for an unknown wafer can be measured by using both the air sensor and the capacitive sensor. Indeed, after d is measured using only the air sensor, the voltage output V of the capacitive sensor becomes a function of only dielectric permittivity K: $V-V_0=f(K-K_0)$.

Figure 1:
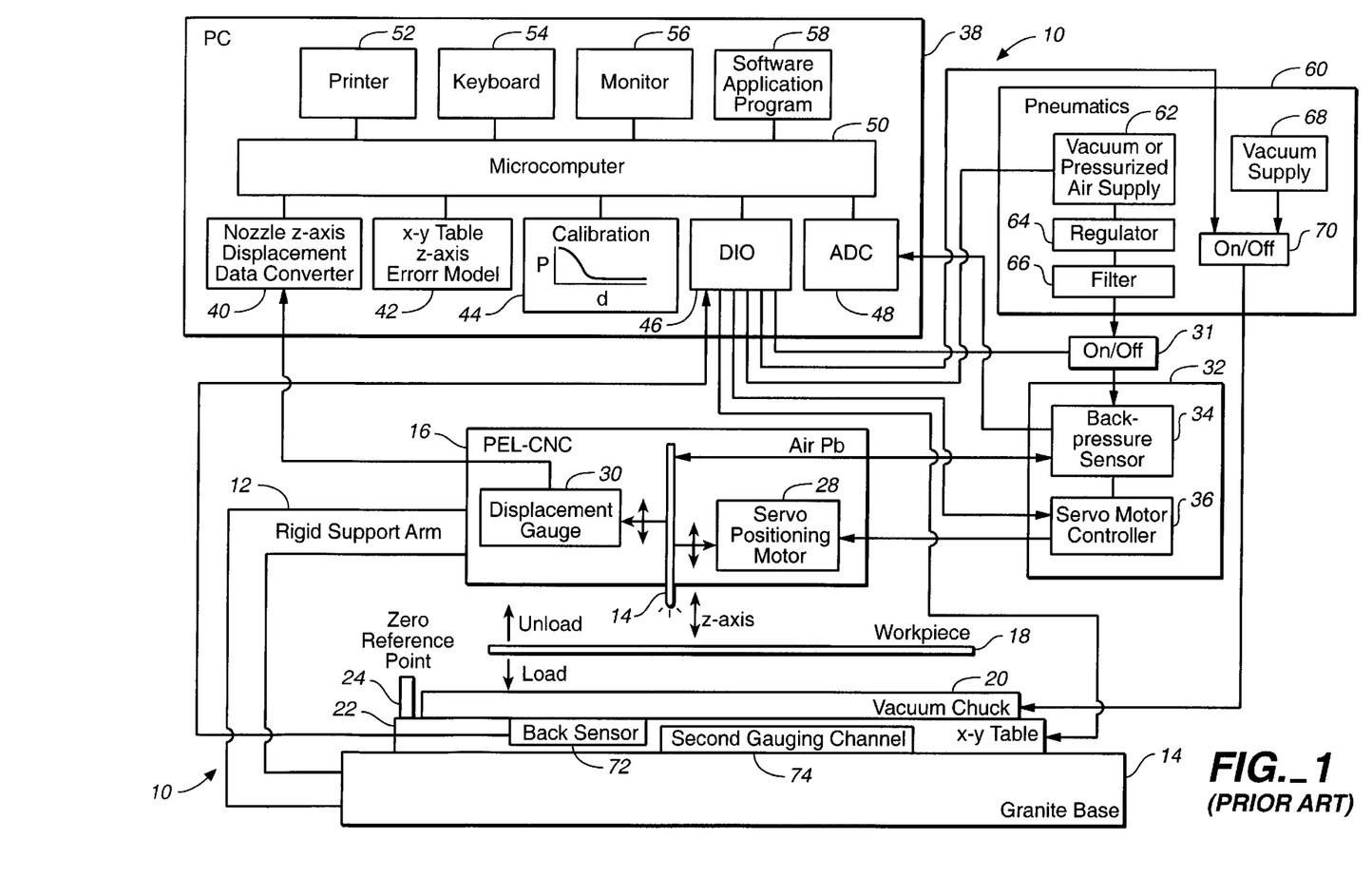
FIG. 1 depicts a prior art functional diagram of a semiconductor wafer measurement system.

FIG. 1A depicts a prior art functional diagram 10 of a semiconductor wafer measurement system according to '661 patent. The system 10 comprises a rigid support arm 12 that is attached between a granite block base 14 and a measurement head 16. A workpiece 18 (for instance, a semiconductor wafer) is manually loaded and unloaded by a user into and out of a vacuum chuck 20. An x-y table 22 is attached to the granite block base 14. The x-y table 22 is electronically controlled to move the wafer 18 to various x-y positions on its x-y horizontal plane. For instance, a z-axis reference point 24 is carried by the x-y table 22 and can be positioned at a point nadir to the measurement head 16, and especially beneath a nozzle 26. A servo-positioning motor 28 is configured to position the tip of the nozzle 26 at near zero altitude over the reference point 24, and to retract the nozzle 26 high enough to be able to load and unload the wafer 18 in the vacuum chuck 20, and at various points in between.

In the preferred embodiment, the nozzle 26 comprises a sensing tip of sapphire material with a one millimeter diameter. The typical z-axis range of the position of the nozzle 26 controlled by the motor 28 is about twenty-five microns. A precision displacement gauge 30 (e.g., an optical displacement encoder) is mechanically connected to the nozzle 26. A constant-air-gap controller 32 can be implemented by using a model PEL-CNC controller manufactured by Sentex Corporation, Santa Clara, Calif. The constant-air-gap controller 32 is used to control the position of the tip of the nozzle 26 relative to the top surface of the wafer 18 so that an air gap stays constant at about 150 microns. A back-pressure sensor 34 can be implemented by using PEL differential back-pressure sensor that is manufactured and proprietary owned by Sentex.

As the tip of the nozzle 26 approaches the top surface of the wafer 18, an air back pressure (Pb) builds. As it is known to those skilled in the art, such position-dependent variable back pressure can be measured by a piezo-resistive Wheatstone bridge, or by a bridge-type circuit for pneumatic gauging.

In the embodiment when the bridge-type circuit for pneumatic gauging is used, an inlet and two branch passageways allow a flow of compressed air that passes from an inlet to an outlet of each branch passageway to be controlled by an adjustable orifice. One of the outlets is connected to the nozzle, or nozzles, of an air gauge head. The pressure of the air flowing past the corresponding adjustable orifice varies as a function of the distance separating the nozzle from the surface. The other branch passageway is vented to atmosphere through a calibrated orifice to establish a zero reference. The differential pressure between the passageways downstream of the adjustable control orifices is monitored by a differential pressure transducer and such provides a measurement signal. In the alternative, the outlet of the second branch passageway is also connected to the nozzle, or nozzles of an air gauge head, for differential measurements.

A PC computer 38 can be implemented using Pentium II chip and WINDOWS 98® operating system. A nozzle-axis displacement data converter 40 can be built on a PC-compatible printed circuit board (PCB). For example, a three-axis encoder interface card for an optical linear and rotary encoders may be used, and such are available from IMS of Haifa, Israel (ims@actcom.co.il). An x-y table z-axis error model 42 and a pressure-versus-distance calibration table 44 are stored in memory (not shown). The x-y table z-axis error model 42 represents empirical measurements of the z-axis at various x-y points of the x-y table 22 when positioned under the measurement head 16. Such measurements are more usefully translated into correction factors that offset the thickness measurements of the wafer 18 during a prior art gauging mode of operation.

During a prior art calibration mode of operation, a servo position feedback signal from the air sensor 34 to the servo motor controller 36 is disabled or otherwise prevented from maintaining the air gap distance at about 150 microns, as is done during measurement mode. During such calibration mode of operation, the pressure-distance calibration table 44 is built from measurements taken while the nozzle 26 is positioned over the reference point 24. For example, the reading of the air sensor 34 is recorded for every ten micron increment from zero of the nozzle by the servo positioning motor 28 as judged by the displacement gauge 30. Calibrations ranging 0–300 microns have been found to be sufficient. An S-shaped pressure-distance function results, with the maximum back pressure (Pb) equaling the supply air pressure when the tip of the nozzle 26 is closed by being at zero altitude over the reference point 24.

A digital input/output (DIO) card 46 provides x-y axis control signals to the x-y table 22, z-axis control signals to the servo motor controller 36, and on/off control signals for air supply and vacuum pneumatics. An analog-to-digital converter (ADC) 48 converts a non-linearized analog signal from the piezo-resistive Wheatstone bridge in the air sensor 34 to a digital word for manipulation by a microcomputer 50. A printer 52 provides general hardcopy outputs. A keyboard 54, and a monitor 56 allow a user to supervise, control, and select between calibration and measurement operational modes. A software application program 58 provides program instructions specific to the proper sequencing of the various components of the system 10. Such program 58 is preferably distributed and loaded separately by conventional CD-ROM disk or floppy disk means.

A prior art pneumatics control module 60 includes a source of vacuum or pressurized air 62 that is on/off controlled by the software application program 58 via the microcomputer 50 and the DIO 46. A regulator 64 provides a constant air pressure and a filter 66 removes particles that could clog or otherwise disrupt the proper functioning of the air sensor 34 and nozzle 26. A vacuum supply 68 has an on/off pneumatic switch 70 that is also controlled by the software application program 58 via the microcomputer 50 and the DIO 46. Vacuum is applied to the vacuum chuck 20 to lock in and hold the wafer 18 during the measurement mode. The prior art overall accuracy of z-axis measurement of the thickness of the wafer 18 is determined by the accuracy of the air sensor 34, which is about 0.1 micron.

Figure 2:
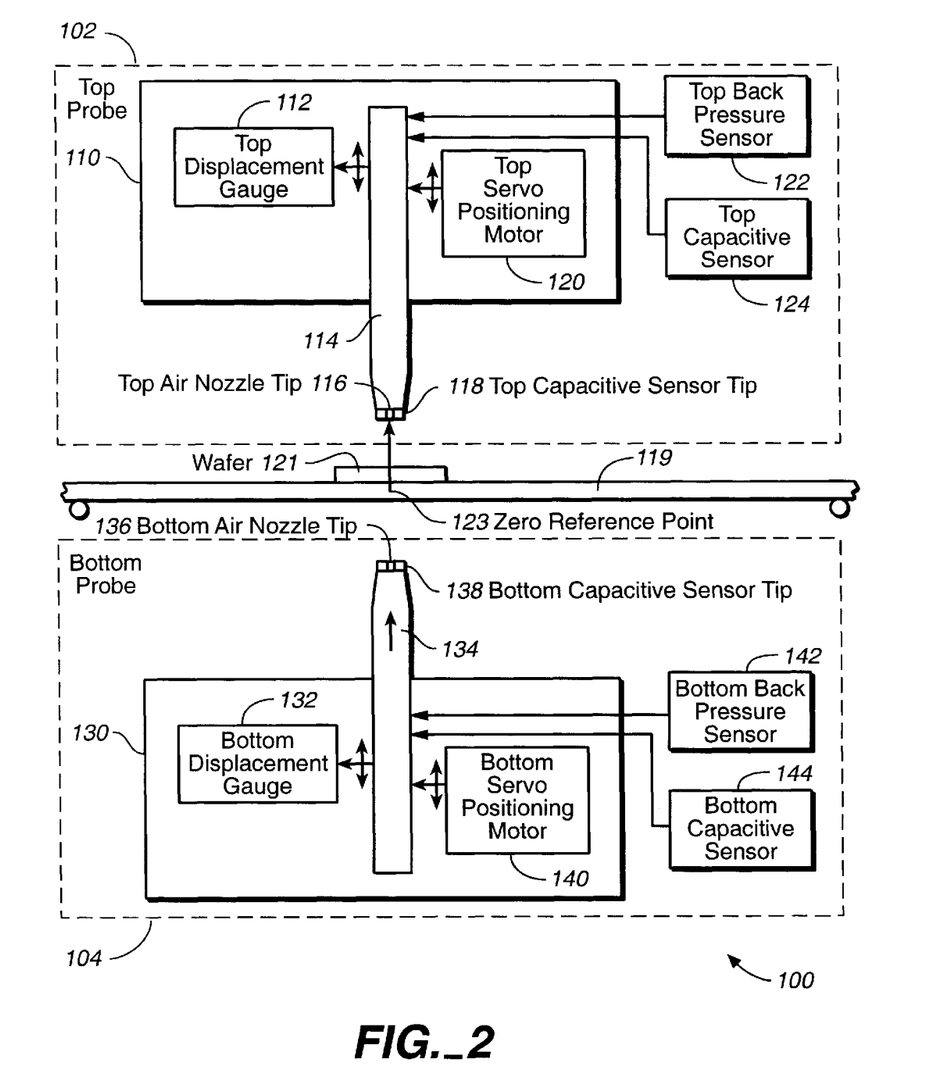
FIG. 2 illustrates the measurement system of the present invention comprising two symmetrical measurement channels, a top channel and a bottom channel, a granite base with a movable stage and an attached ultra thin wafer to be gauged, and a computer (not shown).

The present invention can be best understood by focusing on FIG. 2. As was stated above, the measurement system of the present invention is designed for extended range and ultra precision non contact dimensional gauge for ultra-thin wafers and work pieces. In one embodiment, the measurement system of the present invention comprises the prior art system 10 of FIG. 1, wherein the measurement channel 32 is replaced by two symmetrical measurement channels 102 (top channel) and 104 (bottom channel), as depicted in FIG. 2. The measurement channels 102 and 104 are symmetrically positioned over and under a stable stage 119 on which a semiconductor wafer 121 to be measured is placed and held by resting on 3 (or several) points near its edge (not shown).

The top (first) measurement channel 102 (of FIG. 2) further comprises a first motor-positionable probe 114 that is configured to make a plus (+z) coordinate measurement of the (x, y) point on the surface of the ultra thin target 121. Similarly, the bottom (second) measurement channel 104 (of FIG. 2) further comprises a second motor-positionable probe 134 that is configured to make a minus (−z)-coordinate measurement of exactly the same (x, y) point on the surface of the ultra thin target 121. By comparing the (+z)- coordinates measurements and (−z)-coordinates measurements for each (x, y) point on the surface of the ultra thin target 121 (of FIG. 2) with the (+z)-coordinates measurements and (−z)-coordinates measurements for each (x, y) point on the surface of the reference target (not shown), one can build the database of the difference (+Δz)-coordinates and the difference (−Δz)-coordinates measurements for each (x, y) point on the surface of the ultra thin target as compared with the surface of the reference target (with known thickness, bow and warpage). Using this database, the computer can compute the thickness, the warpage and the bow of the ultra thin target according to the definitions and formulas provided by the methodology standards. Using this database, the computer can also map the surface of the ultra-thin target 121.

Both motor-positionable measurement probes 114 and 134 are held aloft over (probe 114) and under (probe 134) the wafer 121 (or workpiece) and stage 119 by a rigid support bracket (not shown) attached to the stage or support of the stage. In a single channel measurement embodiment, the single motor-positionable measurement probe (not shown) is held aloft over the wafer 121 (or workpiece) and stage 119 by a rigid support bracket (not shown) attached to the stage or support of the stage.

In the preferred embodiment of the present invention, the first (top) motor-positionable probe 114 further comprises a first back pressure probe having a top air nozzle tip 116, and a first capacitive probe having a top capacitive sensor tip 118. Both, the top air nozzle tip 116 and the top capacitive sensor tip 118 are directed at the top side of the wafer 121 (or work piece) and automatically extended to near contact. The first (top) capacitive probe is substantially co-centric with the first (top) back pressure probe. More specifically, the air nozzle is represented by the orifice at the center of the capacitive sensor thus providing 2 co-axis sensors pointing at the same area on the wafer 121 (or the work piece), so that the correlated and substantially simultaneous air pressure measurements of (+z) coordinate and the electrical measurements of (+z) coordinate can be taken for the same (x, y) point on the surface of the target 121.

The tip of the probe 114 is servo-positioned by either the air sensor 122, or the capacitive sensor 124, and motor combination 120 that maintains a gap between the tip and the wafer 121 of about 100-to 150 microns with an overall precision of about 3 to 4 microns. A high resolution top 112 linear displacement gauge is attached to the capacitive tip 118 and air sensor tip 116 and is used to determine the (+z) coordinate of the capacitive and air sensor tip of the probe 114 within 0.1 micron. The (+z) dimension of the wafer 121 (or the work piece) is determined to within 0.1 micron by combining the linear displacement gauge 112 reading with an estimate of the gap derived from the reading of the air nozzle backpressure and/or from the reading of the capacitive sensor 124, with an accuracy of 0.05 microns.

Similarly, in the preferred embodiment of the present invention, the bottom (second) motor-positionable probe 134 further comprises a bottom (second) back pressure probe having a bottom air nozzle tip 136, and a bottom (second) capacitive probe having a bottom capacitive sensor tip 118. Again, the bottom capacitive probe is substantially co-centric with the bottom back pressure probe. Thus, the correlated and substantially simultaneous air pressure measurements and electrical measurements can be taken for the (−z) coordinate of the same (x, y) point on the surface of the target 121. The bottom (second) displacement gauge 132 is connected to the probe 134 to gauge the (−z)-coordinate of the probe 134 within 0.1 micron. Thus, the (−z) dimension of the wafer 121 (or the work piece) is determined to within 0.1 micron by combining the linear displacement gauge 132 reading with an estimate of the gap derived from the reading of the air nozzle backpressure and/or from the reading of the capacitive sensor 144, with an accuracy of 0.05 microns.

Referring still to FIG. 2, in the preferred embodiment of the present invention, a first (top) analog proximity dual sensor comprises a top backpressure sensor 122 and a top capacitive sensor 124. The first (top) analog proximity dual sensor is connected to the tip (116, 118) of the first motor-positionable probe 114. The first analog proximity sensor signal output varies in magnitude according to the proximity of the first tip (116, 118) to the target 118. On the other hand, a first servo positioning motor 120 is mechanically connected to the first motor-positionable probe 114 and provides for an automatic non-contact coarse positioning of the first tip (116, 118) according to the first variable magnitude analog output of the first analog proximity sensor. Thus, the first servo-feedback is established and used for controlling the position of the top probe 114, and the first position gauge 112 is configured to measure the mechanical position of the tip of the first motor-positionable probe 114.

Similarly, a second analog proximity dual sensor comprises a bottom backpressure sensor 142 and a bottom capacitive sensor 144. The bottom analog proximity dual sensor is connected to the tip (136, 138) of the second motor-positionable probe 134. The second analog proximity sensor signal output is determined by the proximity of the tip (136, 138) to the target 118. The second servo-feedback is established and used for controlling the position of the bottom probe 114 by using the second servo positioning motor 140. Indeed, the second servo positioning motor 140 is mechanically connected to the second motor-positionable probe 134 and provides for an automatic non-contact coarse positioning of the bottom tip (136, 138) according to the variable magnitude analog output of the second analog proximity sensor. The second position gauge 132 is configured to measure the mechanical position of the tip of the second motor-positionable probe 134.

In the preferred embodiment of the present invention, the first back pressure probe further comprises an air nozzle that develops increased back pressure within as the first tip 116 (of FIG. 2) nears the target 121 from the (+z) direction. Quite symmetrically, in the preferred embodiment of the present invention, the second back pressure probe also comprises an air nozzle that develops increased back pressure within as the second tip 136 nears the target 121 from the (−z) direction.

In the preferred embodiment of the present invention, the target 121 comprises a conductive target having the dielectric permittivity K. In this embodiment, the first capacitive probe 124 comprises a first source of electrical field that generates a first electrical field. The first electrical field depends on the (+z) distance between the capacitive probe 118 and the conductive target 121, and on the dielectric permittivity K of the conductive target 121. Similarly, in this embodiment, the second capacitive probe 144 comprises a second source of electrical field that generates a second electrical field. The second electrical field depends on the (−z) distance between the capacitive probe 138 and the conductive target 121, and also on the dielectric permittivity K of the conductive target 121.

As was stated above, in the preferred embodiment, the first analog proximity sensor comprises a first air back pressure sensor 122 with a first backpressure analog electric output that increases as the first tip 116 nears the target 121 from (+z) direction. In this embodiment, the first analog proximity sensor also comprises a first capacitive sensor 124 with a first capacitive analog electric output that depends on the distance between the first capacitive probe 118 and the target.

Similarly, the second analog proximity sensor comprises a second air back pressure sensor 142 with a second backpressure analog electric output that increases as the second tip 136 nears the target 121 from (−z) direction. In this embodiment, the second analog proximity sensor also comprises a second capacitive sensor 144 with a second capacitive analog electric output that depends on the distance between the second capacitive probe 138 and the target 121.

The first capacitive analog electric output is calibrated using the first backpressure analog electric output, wherein the second capacitive analog electric output is calibrated using the second backpressure analog electric output. (Please, see the full discussion of the calibration mode below).

The computer (not shown) is used in the same way as the prior art computer circuit 38 (of FIG. 1). A first coarsely servo-positioned position of the first motor-positionable probe 114 is precisely determined by the first position gauge 112, wherein a second coarsely servo-positioned position of the second motor-positionable probe 134 is precisely determined by the second position gauge 132. The first precise probe-to-target distance is obtained by the computer from the first variable magnitude analog output of the first analog proximity sensor, and the second precise probe-to-target distance is obtained by the computer from the second variable magnitude analog output of the second analog proximity sensor.

In the alternative embodiment of the present invention, the measurement system 100 of FIG. 2 utilizes a single measurement channel 102 (or 104) to make precise geometrical measurements of only one surface, top (or bottom) of an ultra-thin wafer 121. For instance, the single channel embodiment of the present invention allows one to map a single surface of a curved ultra thin conductive wafer placed on a hollow (x-y) table. Thus, the given above discussion is fully applicable to a single channel embodiment of the present invention.

Figure 3:
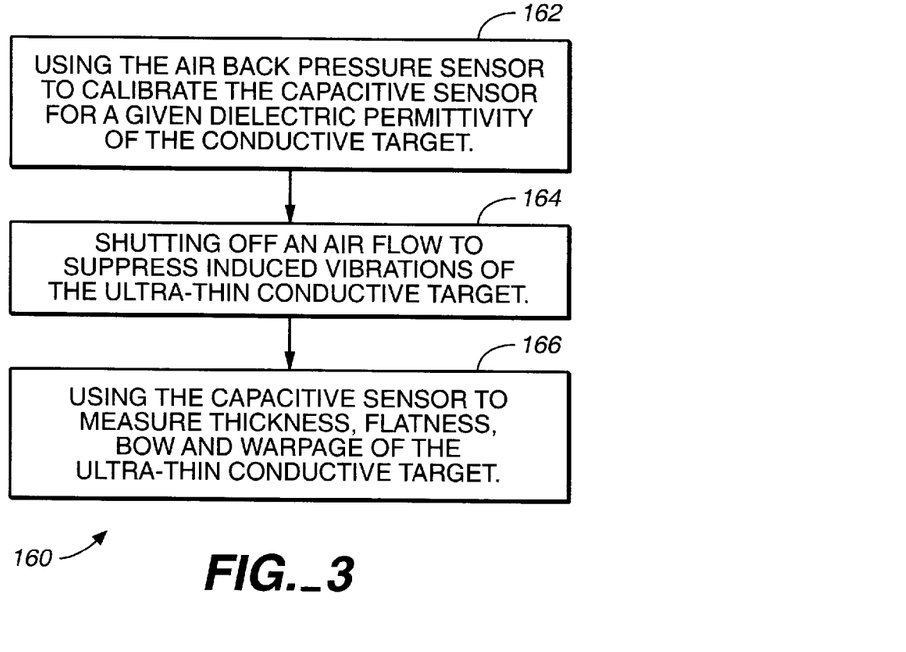
FIG. 3 is a flow chart of basic steps of the method of the present invention for non-contact measurement of thickness, flatness, bow, and warpage of an ultrathin conductive target using a measurement system of the present invention comprising two measurement channels as depicted in FIG. 2.

In the preferred embodiment, FIG. 3 illustrates a flow chart 160 of the basic steps of the method of the present invention for non-contact measurement of thickness, flatness, bow, and warpage of an ultra-thin conductive target by using the double channel measurement system of the present invention comprising two measurement channels 102 and 104 (of FIG. 2). In the alternative embodiment, FIG. 3 depicts the flow chart 160 of the basic steps of the present invention for non-contact measurement of thickness, flatness, bow, and warpage of an ultra thin conductive target by using the single channel measurement system of the present invention comprising a single measurement channel (not shown).

At first (step 162 of FIG. 3), the capacitive sensor for a given dielectric permittivity of the conductive target is calibrated using the air back pressure sensor. Indeed, as was stated above, the combination of both sensors provides for an automatic universal calibration process independent of the dielectric permittivity K of the wafer. The air sensor 122 (142) of FIG. 2 can be used to accurately measure the distance +d (−d) from the probe 114 (134) to the wafer 121 and therefore to build the table V=f(+d) (V=f(−d)) for the voltage output V of the capacitive sensor 124 (144). There is no need to know the dielectric permittivity K of a particular wafer as long as all wafers to be measured are of the same type, that is, they all have the same dielectric permittivity K. The calibration step (162 of FIG. 3) is preferably implemented as a software program within application program and is executed during calibration mode operation by the microcomputer (not shown). The calibration step is used to build the overall table V=f(d) for the voltage output V of both capacitive sensors 124 and 144, wherein the distance d is made up of two distances: the (+d) distance to the target 121 measured by the tip of the probe 114, and the (−d) distance to the target 121 measured by the tip of the probe 134.

The air flow causes vibrations of the ultra-thin conductive target 121 during its normal mode of operation. Therefore, at the second step (164 of FIG. 3), an air flow from the air source (not shown) is shut off to suppress induced vibrations of the ultra-thin conductive target 121. So, the air sensor is used to calibrate the capacitive sensor, and then, after the air is turned off to suppress the induced vibrations of the ultra thin wafer, the capacitive sensor is used to control the motor for positioning of the tip of the probe 114 (134) and to measure the gap (+d) (or (−d)) between the tip of the probe 114 (134) and the top surface (or bottom surface) of the wafer 121.

The next step (166 of FIG. 3) is to use the capacitive sensor to measure the thickness, flatness, bow, and warpage of the ultra thin conductive wafer 121. The step (166) is preferably implemented as another software program within application program and is executed during gauging mode operation by the microcomputer (not shown). The overall z gauging output as a combination of two outputs: (+z) gauging output and (−z) gauging output, can be displayed on the monitor or printed by the printer. Thus, the method 160 of FIG. 3 allows one to measure the thickness, bow and warpage and to map the shape of an ultra thin conductive wafer.

Figure 4:
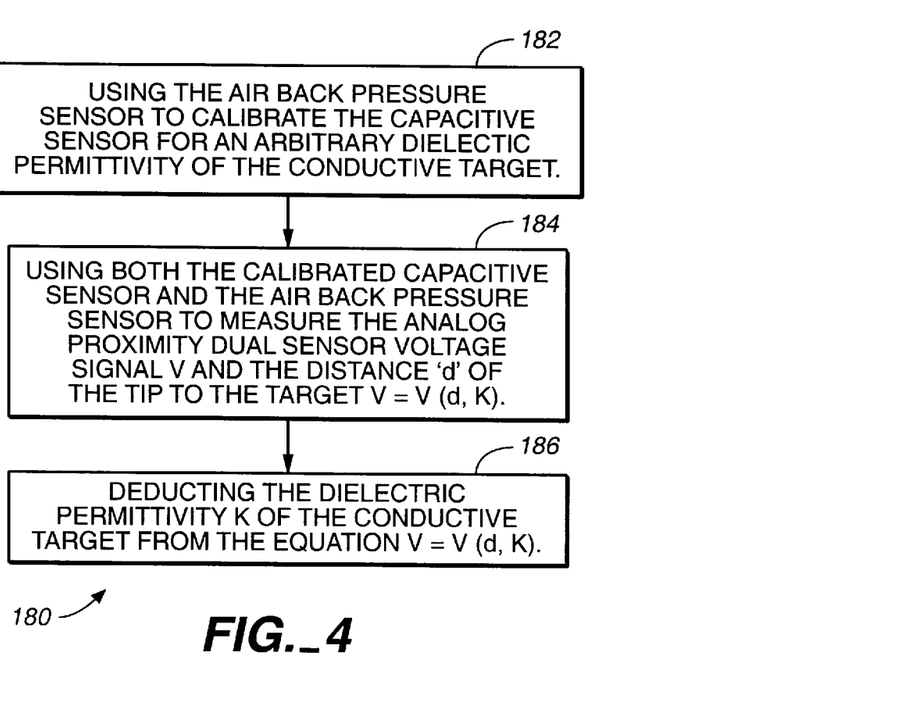
FIG. 4 depicts the flow chart of the basic steps of the present invention for non-contact measurement of dielectric permittivity of an ultra thin conductive target by using a measurement system comprising two measurement channels as depicted in FIG. 2.

In the preferred embodiment, FIG. 4 depicts the flow chart 180 of the basic steps of the present invention for a non-contact measurement of a dielectric permittivity of an ultra thin conductive target by using the double channel measurement system of the present invention comprising two measurement channels 102 and 104 (of FIG. 2). In the alternative embodiment, FIG. 4 depicts the flow chart 180 of the basic steps of the present invention for a non-contact measurement of a dielectric permittivity of an ultra thin conductive target by using the single channel measurement system of the present invention comprising a single measurement channel (not shown).

In the double channel embodiment, the analog proximity dual sensor in each measurement channel is configured to generate a voltage output V that varies in magnitude depending on distance d of the tip of the probe to the target 121. The distance d is made up of two distances: the (+d) distance measured by the tip of the probe 114, and the (−d) distance measured by the tip of the probe 134.

In the preferred embodiment, the method 180 of FIG. 4 comprises the following steps. At first, the air back pressure sensor is used to calibrate the capacitive sensor for an arbitrary dielectric permittivity K of the conductive target (step 182). At the next step (184 of FIG. 4), the analog proximity dual sensor signal comprises the capacitive sensor voltage V signal and the air sensor signal used to measure the distance (+d)/(−d) from the tip of the probe 114 (134) to the target 121. The capacitive sensor is substantially co-centric with the air back pressure sensor. Therefore, the capacitive sensor and the air back pressure sensor both measure the same point on the target surface at substantially the same time, thus building the overall equation V=V (d, K) that is made up of two equations: $V_+ = V$ (+d, K); and $V^- = V$ (−d, K), wherein the distance d is made up of two distances: the (+d) and the (−d) distance. Finally, in the step (186 of FIG. 4), the dielectric permittivity K of the conductive target 121 is deducted from the overall equation V=V (d, K). More specifically, after the overall distance d is measured using only the air sensor, the voltage output V of the capacitive sensor becomes a function of dielectric permittivity K: $V - V_0 = f(K - K_0)$.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A measurement system comprising:
   a first motor-positionable probe; said first motor-positionable probe further comprising:
   a first back pressure probe and a first capacitive probe; said first capacitive probe being substantially co-centric with said first back pressure probe;
   a second motor-positionable probe; said second motor-positionable probe further comprising:
   a second back pressure probe and a second capacitive probe; said second capacitive probe being substantially concentric with said second back pressure probe;
   a first analog proximity dual sensor connected to a tip of said first motor-positionable probe; said first analog proximity sensor having a first output that varies in magnitude according to the proximity of said first tip to a target;
   a second analog proximity dual sensor connected to a tip of said second motor-positionable probe; said second analog proximity sensor having a second output that varies in magnitude according to the proximity of said second tip to a target;
   a first servo motor mechanically connected to said first motor-positionable probe and providing for an automatic non-contact coarse positioning of said first tip within a bandgap distance having a nominal set point distance from said target according to said first variable magnitude analog output of said first analog proximity sensor;
   a second servo motor mechanically connected to said second motor-positionable probe and providing for an automatic non-contact coarse positioning of said second tip within said bandgap distance having said nominal set point distance from said target according to said second variable magnitude analog output of said second analog proximity sensor;
   a first position gauge configured to measure the mechanical position of said first tip of said first motor-positionable probe;
   a second position gauge configured to measure the mechanical position of said second tip of said second motor-positionable probe; and
   a computer for processing a set of measurements comprising a first position gauge measurement, a second position gauge measurement, a first tip-to-target distance measurement estimated from said first variable magnitude analog output of said first analog proximity sensor, and a second tip-to-target distance measurement estimated from said second variable magnitude analog output of said second analog proximity sensor; wherein a first coarsely servo-positioned position of said first motor-positionable probe is precisely determined by said first position gauge, wherein a second coarsely servo-positioned position of said second motor-positionable probe is precisely determined by said second position gauge, wherein a first precise probe-to-target distance is obtained by the computer from said first variable magnitude analog output of said first analog proximity sensor, and wherein a second precise probe-to-target distance is obtained by the computer from said second variable magnitude analog output of said second analog proximity sensor.

2. The measurement system of claim 1, wherein said first back pressure probe further comprises:
   an air nozzle that develops increased back pressure within as said first tip nears said target.

3. The measurement system of claim 1, wherein said second back pressure probe further comprises:
   an air nozzle that develops increased back pressure within as said second tip nears said target.

4. The measurement system of claim 1, wherein said target comprises a conductive target, and wherein said first capacitive probe further comprises:
   a first source of electrical field that generates a first electrical field that depends on the distance between said capacitive probe and said conductive target, and on the dielectric permittivity of said conductive target.

5. The measurement system of claim 1, wherein said target comprises a conductive target, and wherein said second capacitive probe further comprises:
   a second source of electrical field that generates a second electrical field that depends on the distance between said second capacitive probe and said conductive target, and on the dielectric permittivity of said conductive target.

6. The measurement system of claim 1, wherein said first analog proximity sensor further comprises:
   a first air pressure sensor with a first backpressure analog electric output that increases as said first tip nears said target.

7. The measurement system of claim 6, wherein said first analog proximity sensor further comprises:
   a first capacitive sensor with a first capacitive analog electric output that depends on said distance between said first capacitive probe and said target, and wherein said first capacitive analog electric output is calibrated using said first backpressure analog electric output.

8. The measurement system of claim 1, wherein said second analog proximity sensor further comprises:
   a second air pressure sensor with a second backpressure analog electric output that increases as said second tip nears said target.

9. The measurement system of claim 8, wherein said second analog proximity sensor further comprises:
   a second capacitive sensor with a second capacitive analog electric output that depends on said distance between said second capacitive probe and said target, and wherein said second capacitive analog electric output is calibrated using said second backpressure analog electric output.

10. A measurement system comprising:
    a motor-positionable probe; said motor-positionable probe further comprising:
    a back pressure probe and a capacitive probe; said capacitive probe being substantially concentric with said back pressure probe;
    an analog proximity dual sensor connected to a tip of said motor-positionable probe; said analog proximity sensor having an output that varies in magnitude according to the proximity of said tip to a target;
    a servo motor mechanically connected to said motor-positionable probe and providing for an automatic non-contact coarse positioning of said tip within a bandgap distance having a nominal set point distance from said target according to said variable magnitude analog output of said analog proximity sensor;
    a position gauge configured to measure the mechanical position of said tip of said motor-positionable probe; and
    a computer for processing a set of measurements comprising a position gauge measurement, and a tip-to-target distance measurement estimated from said variable magnitude analog output of said analog proximity sensor;

wherein a coarsely servo-positioned position of said motor-positionable probe is precisely determined by said position gauge; and wherein a precise probe-to-target distance is obtained by the computer from said variable magnitude analog output of said analog proximity sensor.

11. The measurement system of claim 10, wherein said back pressure probe further comprises:

an air nozzle that develops increased back pressure within as said tip nears said target.

12. The measurement system of claim 10, wherein said target comprises a conductive target, and wherein said capacitive probe further comprises:

a source of electrical field that generates an electrical field that depends on the distance between said capacitive probe and said conductive target, and on the dielectric permittivity of said conductive target.

13. The measurement system of claim 10, wherein said analog proximity sensor further comprises:

an air pressure sensor with a backpressure analog electric output that increases as said tip nears said target.

14. The measurement system of claim 13, wherein said analog proximity sensor further comprises:

a capacitive sensor with a capacitive analog electric output that depends on said distance between said capacitive probe and said target, and wherein said capacitive analog electric output is calibrated using said backpressure analog electric output.

15. A method for a non-contact measurement of thickness, flatness, bow, and warpage of an ultra-thin conductive target using a measurement system comprising at least two measurement channels and a computer for processing a set of measurements; each said measurement channel further comprising a motor-positionable probe comprising a back pressure probe, a capacitive probe, and a position gauge configured to measure the mechanical position of a tip of said motor-positionable probe; said method comprising the steps of:

using said air back pressure sensor to calibrate said capacitive sensor for a given dielectric permittivity of said conductive target;

shutting off an air flow to suppress induced vibrations of said ultra-thin conductive target; wherein said air flow causes vibrations of said ultra-thin conductive target during its normal mode of operation; and using said capacitive sensor to measure thickness, flatness, bow, and warpage of said ultra-thin conductive target.

16. The method of claim 15, wherein said measurement system further includes an analog proximity dual sensor connected to said tip of said motor-positionable probe; said analog proximity sensor having a voltage output V that varies in magnitude depending on a distance 'd' of said tip to said target; and wherein said step of using said air back pressure sensor to calibrate said capacitive sensor for a given dielectric permittivity K of said conductive target further includes the step of:

calibrating said distance 'd' between said tip of said motor-positionable probe and said ultra-thin conductive target by measuring said voltage signal V generated by said analog proximity sensor as a function of said distance 'd' and said dielectric permittivity K of said conductive target: V=V (d, K).

17. A method for a non-contact measurement of a dielectric permittivity of a electrically conductive target by using a measurement system comprising at least two measurement channels and a computer for processing a set of measurements; each said measurement channel further comprising a motor-positionable probe comprising a back pressure probe or sensor, a capacitive probe, and a position gauge configured to measure the mechanical position of a tip of said motor-positionable probe, and an analog proximity dual sensor configured to generate an voltage output that varies in magnitude depending on a distance of said tip to said target; said method comprising the steps of:

using said air back pressure sensor to calibrate said capacitive sensor for an arbitrary dielectric permittivity of said conductive target;

using both said calibrated capacitive sensor and said air back pressure sensor to measure said analog proximity dual sensor voltage signal and said distance of said tip to said target, and to build a measurement equation; wherein said capacitive sensor is substantially concentric with said air back pressure sensor, and wherein said capacitive sensor and said air back pressure sensor both measure the same point of said target surface at substantially the same time; and deducting said dielectric permittivity of said conductive target from said measurement equation.

18. A method for a non-contact measurement of a dielectric permittivity K of a electrically conductive target by using a measurement system comprising at least two measurement channels and a computer for processing a set of measurements; each said measurement channel further comprising a motor-positionable probe comprising a air back pressure probe or sensor, a capacitive probe, and a position gauge configured to measure the mechanical position of a tip of said motor-positionable probe, and an analog proximity dual sensor configured to generate an voltage output V that varies in magnitude depending on a distance 'd' of said tip to said target; said method comprising the steps of:

using said air back pressure sensor to calibrate said capacitive sensor for an arbitrary dielectric permittivity of said conductive target;

using both said calibrated capacitive sensor and said air back pressure sensor to measure said analog proximity dual sensor voltage signal V and said distance 'd' of said tip to said target V=V (d, K), wherein said capacitive sensor is substantially concentric with said air back pressure sensor, and wherein said capacitive sensor and said air back pressure sensor both measure the same point of said target surface at substantially the same time; and deducting said dielectric permittivity K of said electrically conductive target from said equation V=V (d, K).

* * * * *